Jan. 23, 1968   A. G. REBOURS   3,364,660
DEVICE FOR INTIMATELY CONTACTING A GAS WITH A LIQUID
Filed April 2, 1965   3 Sheets-Sheet 1

Inventor:
ALBERT G. REBOURS
BY
H. Edward Mestern

Jan. 23, 1968     A. G. REBOURS     3,364,660
DEVICE FOR INTIMATELY CONTACTING A GAS WITH A LIQUID
Filed April 2, 1965     3 Sheets-Sheet 2

Inventor:
ALBERT G. REBOURS
BY
H. Edward Mestern

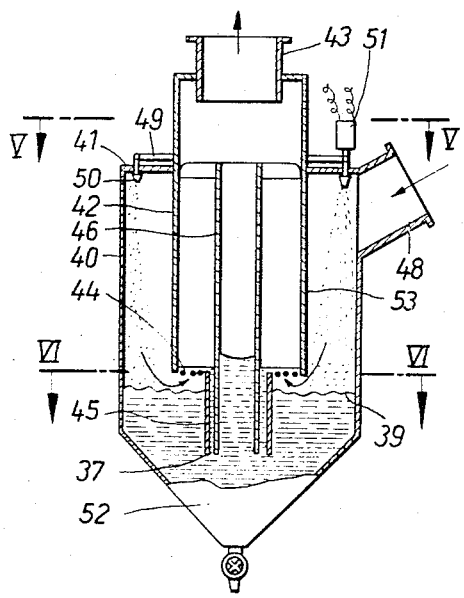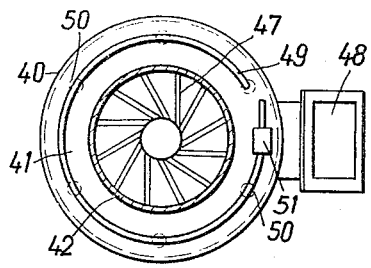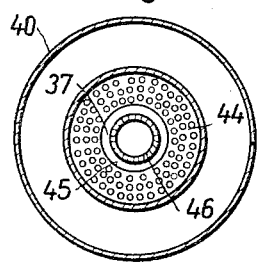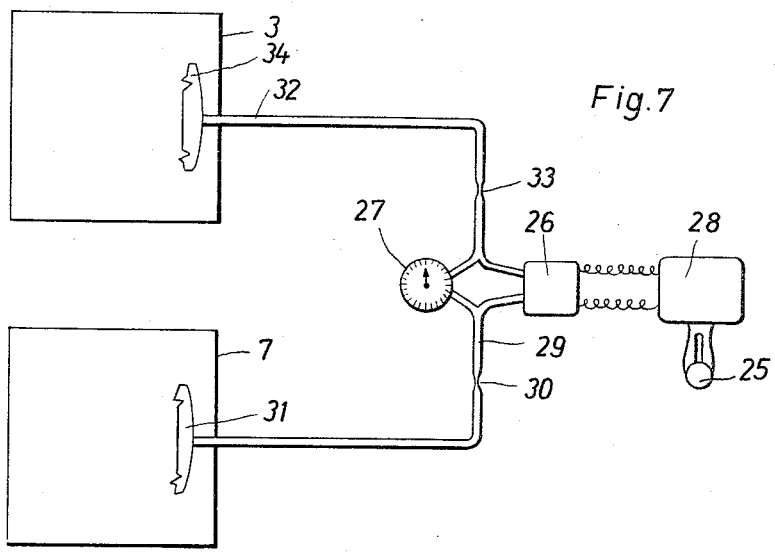

United States Patent Office 3,364,660
Patented Jan. 23, 1968

3,364,660
DEVICE FOR INTIMATELY CONTACTING A
GAS WITH A LIQUID
Albert G. Rebours, Chatou, France, assignor to
Societe Prat-Daniel, Paris, France
Filed Apr. 2, 1965, Ser. No. 445,037
Claims priority, application France, Apr. 2, 1964,
969,630
4 Claims. (Cl. 55—225)

The present invention relates to a device or apparatus for bringing a gas into intimate contact with a liquid, and more particularly to an apparatus referred to as a gas washer.

It is known to purify dust suspended in a gas by means of an eddy bed formed by droplets of liquid carried or supported by a turbulently rising flow of gas. The dust conveyed from the gas into the droplets of liquid are then discharged as fine sediment from the bed.

The droplet eddy bed may be constructed by means of a grid, on which a layer of liquid is located, through which the gas, from which dust is to be removed, passes at such a velocity that the liquid is released above the grid and by its cooperation with the gas, forms a droplet eddy bed. Known apparatus derived from this method operation, have the disadvantage of not being able to safely maintain a constancy in the proportion of the volumes of gas to liquid. Only if there is such constancy can the desired high rate of dust removal as well as the stability of the purification of the gas be attained. Furthermore, known devices are often prone to obstruction, whereby the rate of dust removal is consequently decreased. If there is too much gas present, then the droplet bed is not capable of purifying it. In the most unfavorable case, it is broken up by the gas. If the gas flows too slowly, then a good droplet bed is not formed.

It is an object of the invention to remedy or minimize the above mentioned drawbacks. It is a further object of the invention to provide improvements in apparatus for washing gases. With these and other objects in view, it consists in a method for bringing a gas into contact with a liquid, said method comprising the steps of feeding the gas from above towards the surface of the liquid contained in a supply container and having a perforated cover thereover creating a difference in pressure of the gas flow, below and above said cover, whereby said gas rises through said cover atomizing said liquid, forming an eddy bed of liquid droplets, the liquid subsequently flowing towards said supply container for reuse.

The invention produces a homogeneous wash independently of a varying amount of gas within areas of treatment, which are no longer subjected to the danger of obstruction.

The particularity of the new method for producing an eddy bed formed by droplets of liquid by an upward flow of gas influenced by the droplets, consists in that the gas is conveyed from above to the surface of the liquid in the lower part of a container whereby the liquid is then lifted high as an eddy bed in another part of the container by the upwardly deflected flow of gas while turning into droplets.

The invention consists also in apparatus for bringing a gas into contact with a liquid, comprising a container and at least two pipes, for conveying the entering gas to the surface of liquid than is contained in the lower part of said container in a uniformly distributed manner.

In order that the invention may be more clearly understood, reference will now be made to the accompanying drawings which show embodiments thereof by way of example, and in which:

FIGURE 4 shows an axial section through another embodiment of the invention.

FIGURE 5 shows a section along the line V—V of FIGURE 4, in the direction of the arrows, FIGURE 6 shows a section along the line VI—VI of FIGURE 4 in the direction of the arrows.

FIGURE 7 shows a detail of a control device suitable for the application of the method in the apparatus.

Figure 1:
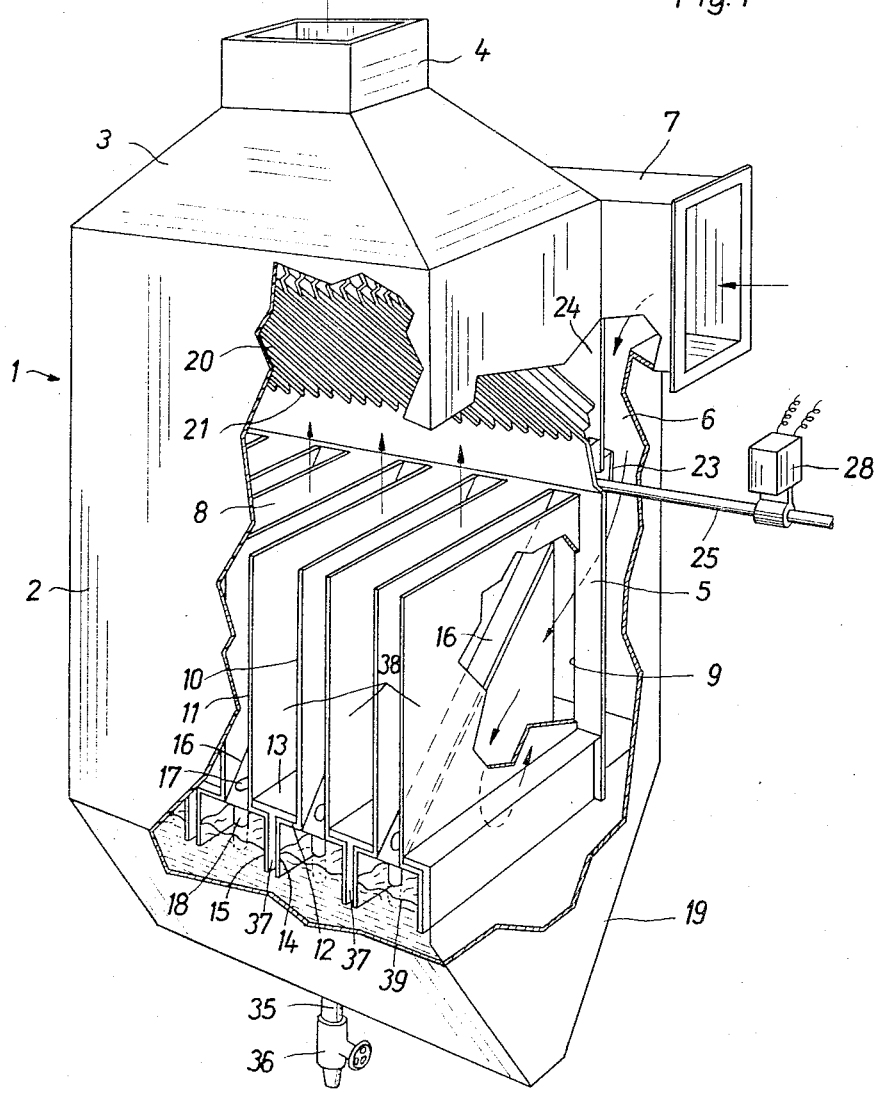
FIGURE 1 shows in a diagrammatic form with parts broken away, one embodiment of apparatus for carrying out the method according to the invention.

Referring now to the drawings, the apparatus consists of a housing 1 having a lower part 19, forming a supply container for liquid, a central part 2 and an upper part 3, which terminates in an outlet conduit 4 for gas. The housing 1 is divided by a longitudinal partition 5 into two gas-tight parts 24, specifically an inlet chamber 6, in which the gas to be treated enters through a conduit 7, and treatment zone 8. As FIGURES 1 and 2 show, the partition 5 does not extend right down to the base of the part forming the liquid supply container, and the liquid located in this latter consequently serves as a hydraulic seal between the chamber 6 and the treatment zone 8.

The partition 5 has any desired number of longitudinal openings 9, through which the gas may enter into constructional parts 38 for contacting or washing in the zone 8.

Figure 2:
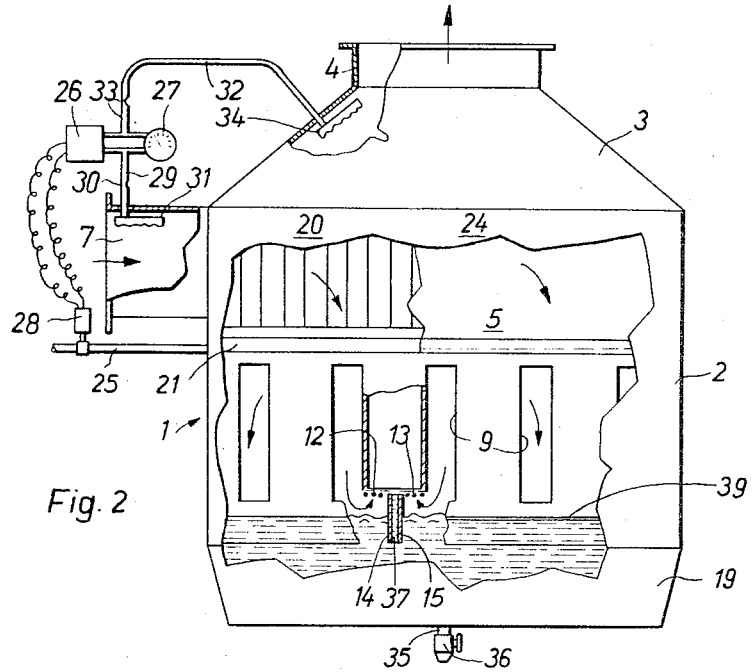
FIGURE 2 shows on a smaller scale, a side view of the apparatus of FIGURE 1, particularly showing the inlet chambers for the gas to be treated.

These constructional parts, which may be particularly seen in FIGURE 1, are defined by one or two side walls 10, 11, which are parallel to one another and which are secured on the one hand to the partition 5 and on the other hand to the wall of the housing 1. The successive constructional parts are separated from one another by a recess, which corresponds to the width of the openings 9 of the partition 5. Two horizontal perforated sheets 12, 13 are secured to the lower side of the walls 10 and 11, which sheets are located in the same plane, and which form the atomizing grid of the device. These perforated sheets extend in line with one another, until they reach a certain distance from one another and extend vertically through the sheets or single constructional parts 14 and 15, which extend in line downwardly to a point below the level of the liquid. These immersed parts 14, 15 define feeding channels 37 for conveying the liquid to the grids or perforated sheets 12, 13.

An inclined partition 16 is secured between the walls of two adjacent constructional parts, which wall extends from the upper edge of the corresponding opening 9 to the wall of the housing at the level of the grid. This inclined partition and the walls 10, 11 form a passage, which guides the gas from the inlet chamber 6 to beneath the grids for effecting the contact operation.

An opening 17 is arranged in the lower part of this partition 16. A tube 18 extends downwardly from this opening until it reaches the interior of the supply container 2 below the level of the liquid.

This arrangement makes it possible for the liquid between the side walls 10, 11 of the two adjacent parts to reenter in order to return to the supply container. A row of deflecting plates 20 extends at right angles over the area 8 in the upper part of the housing 1. This arrangement forms a device for collecting the droplets of liquid, which are carried forward by the gas, and issuing from the washing elements. These deflecting plates are arranged in such a manner that the droplets separated from the gas fall into a horizontal liquid channel 23.

This liquid channel 23 extends above the upper ends of the walls 10, 11 of the parts 38, over the total length of the partition wall 5. The lower side 21 is located in the zone 8, and the upper side 23 is located in the inlet chamber 6. The edge of the channel on the side of the chamber 6 is lower than on the side of the zone 8, so that it is possible for the liquid to flow downwards along the partition 5 on the side of the inlet chamber for the gas. A one-way valve can also assist this outflow. The dividing wall 24, in line with the base of the channel is perforated in such a way that it is possible for the liquid to pass from the zone 8 into the chamber 6 as is further explained hereinafter.

A pipe 25 is arranged in the base of this channel to allow fresh liquid to enter the device, coming from a suitable feeding source. This conveyance of the fresh liquid is controlled in dependence upon the difference in pressure of the gas in the inlet and outlet of the apparatus by an automatic control means, which is shown in FIGURE 2.

This control means include an electrical device 26 for determining the pressure (e.g. with a diaphragm), a manometer 27 and slider 28, which is arranged in the pipe 25 and is controlled by means of the device 26. The device 26 is connected to a pressure measuring device 31 having a diaphragm, by means of a tube 29 having a constriction 30, which measuring device is located in the inlet tube 7 for the gas and is also connected to a pressure measuring device 34 having a diaphragm by means of a tube 32 having a constriction 33, which measuring device 24 is arranged on the upper end of the apparatus at the gas outlet. The method of operation of this control device is further explained hereinafter.

Finally, an outlet tube 35 having a stop-cock 36, is provided on the base of the supply container 2, so that the liquid may be emptied from the apparatus.

The method of operation of the apparatus will now be explained with reference to FIGURES 1 and 2.

The washing liquid (e.g. the water) is fed into the supply container 19 so that its level is located just below the perforated sheets of the contacting elements.

The gas fed in at 7 enters the chamber 6 and is then divided up by the row of lateral passages, which extend through the square partition 5. Having passed through the passages, the gas appears on the lower part of the washing element 38, passes through the perforated sheets 12, 13 and enters the active zone 8 of the apparatus which is formed by the vertical passages, defined by the side walls 10, 11. The number of these passages is selected in dependence upon the amount of gas to be treated. The different flows of gas at the upper end of the zone 8 are united again at the outlet of the washing passages before the gases pass through the deflecting plate 20, and the purified gases leaves the upper end of the device at 4. The speed of the gas in the side passages at the inlet is generally more than 8 m./sec., but it may vary within greater limits in dependence upon the treatment desired. Under the effect of the difference in pressure prevailing on both sides of the grid (this is a question of the difference of pressure, which is produced by the gas passing through the grid at a higher speed), the liquid continually rises through the plates 14, 15 and will then flow above the grids where the liquid is atomized by the flow of gas. The very dense suspension of the droplets thus formed is carried forward upwardly with regard to the apparatus, and during this movement, the dust is taken up by the droplets of the liquid, as well as captured by means of the deflecting plate 20. The liquid carrying the dust is collected in the channel 21, and the liquid is delivered from there into the inlet chamber 6 of the apparatus. The trickle thus formed serves for washing the partition 5 and the passages 9 for the gas inlet. This device makes it possible for any obstruction of this zone by the dust to be avoided. The liquid then falls back into the supply container 19, where the dust settles.

The conveying of the liquid is controlled by the slider 28 of the described control device. The liquid is led into the device at the lower end of the channel 21, in such a way that any deposition of sediment here is avoided. The entry of the flow into the liquid is compensated by a continuous or discontinuous purification of the contaminated liquid at 35, this purification being if necessary carried out with a draining device which is located at the lower end of the supply container 19.

By reason of the system used for feeding in the liquid, it is very important that the fall in pressure of the gas passing through the apparatus be held within such a limiting value that each element 38 for washing the gas is continuously provided with liquid. It is also absolutely necessary that the value of the drop in pressure can be altered, which may be selected in accordance with the efficiency required and of the necessary rate of flow of the gas. If the latter parameter is stationary, an increase in the drop in pressure of the gas corresponds to an increase in the amount of water, which is suspended in the shape of droplets, whereby there is a better efficiency of the washing.

For a given rate of flow and a given drop in pressure, the supply of the liquid to the washing elements depends upon the distance between the height of the grids 12, 13 and the continuously existing upper level of the liquid in the liquid supply container. It is consequently preferable to regulate this latter level, which depends upon the amount of water in the apparatus, and a regulating or adjusting device is provided for this purpose. This regulating or adjusting device includes the electrical device 26 to indicate the changes in the drop in pressure $\Delta p$ of the gas passes through the apparatus. If $\Delta p$ assumes a value lower than a predetermined limiting value which is a function of the selected working conditions, the manometer operates the slider 28, which opens the supply circuit for the liquid through the pipe 25. This method of operation together with an outflow of the dust-laden liquid from the device at 35 makes it possible for the supply of the liquid to the washing elements or the contacting elements E to be accurately regulated by means of the prevailing difference in pressure.

The lower surface of the grids and the partition 5 of the inlet chamber are particularly subjected to the danger of obstruction and this necessitates this part of the apparatus to be continuously washed. The embodiment of the apparatus shown makes this washing possible by reason of the small distance between the sheets forming the grids and the continuous surface of the liquid in the supply container 19 and the turbulence of the flow of gas leads to waves being formed, and the liquid thus put into contact removes the dust deposits. On the other hand, the liquid coming from the droplet collector or the deflecting sheet 20 requires that the partition 5 and the passages for the gas inflow be constantly washed.

Figure 3:
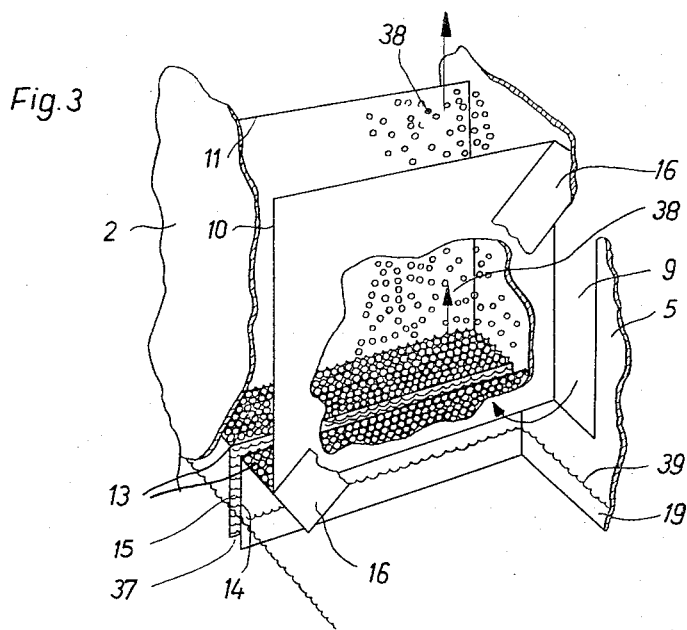
FIGURE 3 shows a diagram on a smaller scale than that of FIGURE 1 a simplified version of the operative method.

FIGURE 3 is a detail, on a scale smaller than that of FIGURE 1, illustrating the basic method of operation.

The gas to be treated enters downwardly into the lower part of the housing through the slot 9 in the rear partition 5 of the housing below the sloping cover sheet 16, and enters the space above the level of the liquid 39 in the container 19 and below the filter plates 13 arranged at a distance thereabove.

The gas pressure is uniformly distributed over the whole level of the liquid 39. The pressure of the liquid causes the liquid 37 in the space between the walls 14 and 15 to rise and to extend over the perforated bases 12, 13. If now the gas passes through these bases 12, 13, as the rising arrows in FIGURE 3 indicate, then a droplet bed 38 is formed between the walls 10 and 11 as well as the front housing wall 2, in which bed the reciprocal action between gas and liquid occurs automatically according to the invention.

FIGURES 4 and 6 show a further embodiment of the apparatus according to the invention. This apparatus has a cylindrical housing 40 which has a lower wedge shaped 52, joining the supply container for the liquid. A cylindrical element 53 is arranged in the center of the housing for effecting contact, while element is secured in a sealed manner to the plate 41 which connects the housing to the upper part. The volume defined by the wall of the housing and by the constructional element 53 forms the inlet chamber for the gas to be treated. The constructional element 53 is defined by a circular wall 42, and an outlet pipe 43 for the treated gas is secured to the upper end thereof. An annular, perforated sheet 44 is arranged at the lower end of the circular wall 42 and in line with the interior of the constructional element, the inner part of said sheet, merging into an axial pipe 46. This pipe extends downwardly into the interior of a liquid supply container 40a below the level of the liquid.

An axial tube 46 having a smaller diameter than that of the tube 45 is located centrally of the element 53 and its upper parts leads into a centrifuge having blades 47, by means of which a centrifugal movement is imparted to the suspension of the droplets before leaving the device, and consequently serves to separate the droplets of liquid from the treated gas. These droplets are returned into the supply container 52 again through the axial tube 46.

The annular space between the tubes 45 and 46 form a channel 37 for conveying the liquid to the upper surface of the perforated sheet 44, which forms the grid.

The apparatus is completed by a conduit 48 for conveying the gas to be treated into the inlet chamber and an annular pipe 49 for the inlet of the liquid, which has conduit spraying devices 50, which are distributed over the upper end of the inlet chamber for the gas. This conduit has a slider 51, which is controlled by a control device, similar to that described with reference to FIGURE 2.

The method of operation of this embodiment of the apparatus is the same as that according to FIGURES 1 and 2. The apparatus according to the invention can be used for washing dust-laden gas, collecting solid or liquid particles suspended in the gas, for absorbing a gas and a liquid etc. and generally finds application in all cases where it is desired to bring a gas into contact with a liquid.

The control device shown in FIGURE 7, which regulates the gas pressure and droplet bed so that these have the best mutual effect, consists essentially of a pressure-sensitive diaphragm 26, having an electrical feeler, an indicating manometer 27, an electro-magnetic switch 28, two damping devices 30, 33 which operate by throttling the pipes in which they are connected.

Furthermore, the control device contains two pressure-sensitive devices 34 of any known instruction. One of these devices is arranged in the inlet connection 7 to the housing, the other in the housing outlet 4. These devices are so constructed and operated, that the measuring circuit is protected against dampness and dust. The simplest protection consists in a flexible membrane to cover each pressure serving apparatus in such a way that compressing forces react positively on the apparatus, while dust and damp are kept away from them.

The electrical device 26 reacts as desired on a change in the differential pressure of the gases passing through the housing. If the pressure of the gas falls below that value has been ascertained as being particularly favourable for operation, then the electrical pressure-sensitive means 26 reacts on the electro-magnetic switch 28. This latter then correspondingly opens the supply pipe for the liquid. This supply of liquid furthermore is synchronized, according to an apparatus constant, with the outlet 35 for contaminated liquid, e.g. fine sediment.

As a result of the construction of the device and its method of operation, it is possible uniformly to distribute the gas pressure constantly over the surface of the liquid, to adapt the level of the liquid to this gas pressure and to produce a uniformly distributed droplet bed over the whole cross section of the housing, the height and liquid contents of which bed ensures the most favorable mutual influence with the actual amount of gas.

I claim:

1. A device for the purification of dustladen gases with a liquid forming a fluid bed of liquid drops which comprises, in combination, a container having an upper, a middle, a lower part; the lower part serving as storage for said liquid; a longitudinal wall gastightly partitioning the container into two sections and extending into the liquid in the lower part of said container, the liquid thus acting as a hydraulic seal; one of said sections being the entrance chamber for the gas to be purified, the other section being a treating chamber; said wall having a plurality of elongated openings for the entry of said gas into said treating zone; said treating zone being defined by two parallel side walls, fastened to said longitudinal wall and to the wall of said container; at least one perforated screen disposed on said side walls near their lower ends but above the liquid level; a plurality of baffle plates in the upper part of said container for the separation of purified gas from liquid drops, now laden with dust; means for reconducting liquid plus dust into said liquid storage; means for drawing off settled dust from said storage; inlet means and regulating means for maintaining a given liquid level for said liquid in the lower part of said container; inlet means for said gas near the bottom of said container just below said screen; means for providing a turbulent ascending gas stream through said screen; pressure regulating means responding to the pressure different above and below said screen for maintaining the liquid level; said means for reconducting said liquid at all times keeping the container free from dust deposits.

2. An apparatus for bringing a gas in contact with a liquid comprising a housing; a container for liquid in said housing; means for conducting a gas substantially from the top of said housing to said container; a perforated cover above the liquid in said container, imparting a difference in pressure to the gas above and below said cover; said cover being constructed as a plurality of lower channels immersed in said liquid and a plurality of upper channels above the horizontal surface of said cover; a wall, sloping steeply relative to the surface of the liquid, in each of said upper channels; a tube disposed in each of said upper channels, branching off the lower end of said sloping wall and extending below the surface of said liquid; said gas returning in upward direction through said upper channels and being led away from liquid returning downwardly in droplet form, said liquid having been raised through said tubes in correspondence with the difference in gas pressure.

3. Apparatus according to claim 2 comprising further a sloping profiled grid arranged in the upper part of said housing, said grid forming a means to entrap liquid droplets, and means interconnecting said grid and said liquid container.

4. Apparatus according to claim 3 and comprising an overflow means connected to a collecting tray on the inlet channel for the gas in order to spray the housing walls and the channels through which the gas passes.

References Cited

UNITED STATES PATENTS

| | | | |
|---|---|---|---|
| 2,033,368 | 3/1936 | Altgelt | 55—234 X |
| 2,409,558 | 10/1946 | Gunn | 55—95 X |
| 2,585,659 | 2/1952 | Kilpatrick | 55—85 X |
| 2,788,084 | 4/1957 | Holzknecht | 261—123 |
| 3,094,574 | 5/1963 | Glasgow et al. | 261—114 X |

FOREIGN PATENTS 630,583   8/1927   France.

SAMIH N. ZAHARNA, *Primary Examiner.*

REUBEN FRIEDMAN, *Examiner.*

J. ADEE, *Assistant Examiner.*